(12) United States Patent
Spiegel (10) Patent No.: US 11,706,221 B1
(45) Date of Patent: Jul. 18, 2023

(54) UNIDIRECTIONAL ATOMIC MESSAGING

(71) Applicant: Two Six Labs, LLC, Arlington, VA (US)

(72) Inventor: Michael Spiegel, Vienna, VA (US)

(73) Assignee: Two Six Labs, LLC, Arlington, VA (US)

( * ) Notice: Subject to any disclaimer, the term of this patent is extended or adjusted under 35 U.S.C. 154(b) by 80 days.

(21) Appl. No.: 17/329,551

(22) Filed: May 25, 2021

(51) Int. Cl.
*H04L 9/40* (2022.01)

(52) U.S. Cl.
CPC .................................. *H04L 63/101* (2013.01)

(58) Field of Classification Search
CPC .................................................... H04L 63/101
See application file for complete search history.

(56) References Cited

U.S. PATENT DOCUMENTS

| | | | | |
|---|---|---|---|---|
| 9,703,482 | B2* | 7/2017 | Uluski | G06F 9/45558 |
| 11,169,973 | B2* | 11/2021 | Hegde | G06F 16/1837 |
| 2011/0099204 | A1* | 4/2011 | Thaler | G06F 9/5038 |
| | | | | 707/E17.044 |
| 2011/0265083 | A1* | 10/2011 | Davis | G06F 12/0866 |
| | | | | 718/1 |
| 2011/0314279 | A1* | 12/2011 | Ureche | H04L 63/067 |
| | | | | 713/168 |
| 2012/0311573 | A1* | 12/2012 | Govindaraju | G06F 3/0689 |
| | | | | 718/1 |
| 2013/0054932 | A1* | 2/2013 | Acharya | G06F 3/0631 |
| | | | | 711/E12.078 |
| 2013/0282997 | A1* | 10/2013 | Suzuki | G06F 11/1448 |
| | | | | 711/170 |
| 2019/0372779 | A1* | 12/2019 | Monica | H04L 9/14 |
| 2020/0058381 | A1* | 2/2020 | Patel | G16H 10/60 |
| 2020/0226268 | A1* | 7/2020 | Zlotnick | G06F 21/64 |
| 2020/0228530 | A1* | 7/2020 | Zlotnick | H04L 63/10 |
| 2020/0380153 | A1* | 12/2020 | Mi | H04L 63/126 |

* cited by examiner

*Primary Examiner* — Yonas A Bayou
(74) *Attorney, Agent, or Firm* — Armis IP Law, LLC (57) ABSTRACT

A shared memory system for providing unidirectional communication across a security threshold defined by producer and consumer of a message at different security levels. A unidirectional shared memory element is accessible for read and write access by the message producer (sender), and the consumer (receiver) has only read access. Transmission logic ensures atomic receipt of the message if it is received, as the receiver cannot issue an acknowledgement to the sender as in conventional electronic interfaces. An arrangement of indices and counters allows asynchronous operation by the sender and receiver, as messages may queue up in the shared memory if the producer exceeds the consumer. In the event of a failure, anomaly, or resource overrun, it is known that messages that were received were received in entirety; in other words, atomicity is preserved.

18 Claims, 7 Drawing Sheets

UNIDIRECTIONAL ATOMIC MESSAGING

STATEMENT REGARDING FEDERALLY SPONSORED RESEARCH AND DEVELOPMENT

This invention was made, at least in part, with government support under Contract No. HR0011-19-C-0103. The Government has certain rights in the invention.

BACKGROUND

Electronic network security protects network transactions from interception and/or interpretation. The fleeting electronic nature of sensitive data imposes particular requirements on systems that support such transactions. Electronic copying and cutting/pasting can be difficult, if not impossible, to detect, for example. Institutions and organizations with a large number of sensitive transactions often establish discrete level of security, such as "Confidential," "Secret" and "Top Secret." Network transactions in such environments need to be cognizant of these security levels, to ensure that data in a network transaction at one level does not erroneously pass to a system or environment with a lesser level of security.

Multilevel security systems are software systems with multiple computers that are processing information at different security or classification levels. Often this may enforce strict unidirectional communication. Existing multilevel security systems use an air gap between different classification levels. To effect a transaction, a human operator will be sitting at two computer terminals at different classification levels and manually copy the appropriate information from one terminal to another, preferably without making any errors that corrupt the message.

SUMMARY

A shared memory system for providing unidirectional communication across a security threshold defined by producer and consumer of a message at different security levels. A unidirectional shared memory element is accessible for read and write access by the message producer (sender), and the consumer (receiver) has only read access. Transmission logic ensures atomic receipt of the message if it is received, as the receiver cannot issue an acknowledgement to the sender as in conventional electronic interfaces. An arrangement of indices and counters allows asynchronous operation by the sender and receiver, as messages may queue up in the shared memory if the producer exceeds the consumer. In the event of a failure, anomaly, or resource overrun, it is known that messages that were received were received in entirety; in other words, atomicity was preserved.

Configurations herein are based, in part, on the observation that unidirectional transmission interfaces satisfy security requirements between computers operating and different security classification levels. Strict unidirectional communication is inherently a best-effort, or unreliable, communication model. Acknowledgement of messages from a consumer to a producer is not allowed. Message acknowledgements can be used as a communication backchannel. Security vulnerabilities have exploited this behavior. This is not a weakness of a specific communication implementation. Unidirectional communication is mathematically a best-effort communication model.

Unfortunately, conventional approaches to unidirectional communication suffer from the shortcoming that either a physical, "air gap" separation and human-paper interface imposed, or a one-way memory that affords no feedback of accurate transmission or receipt. Accordingly, configurations herein substantially overcome the shortcomings of rigid unidirectional communications by providing an atomic shared memory buffer that the message producer can at least be assured that a message was received in entirety, or not at all. In this manner, the producer receives at least some assurance about the atomic form of information received at the consumer, allowing for structuring of alternative "fallback" measures to guard against non-receipt of a particular message.

In further detail, in an information processing environment having a plurality of computing devices for storing and processing data, a method of transferring data in accordance with a security standard for limiting memory access devices between respective memories of the computing devices employs a shared memory region and/or device between the devices such that the message producer has read/write access and the message consumer only has read access. This arrangement mitigates a security risk when the sender/producer has a higher security level than the receiver/consumer. The message producer stores a message for transmission to a message consumer into a shared memory accessible for reading by the message consumer, such that the shared memory is unavailable for write access by the message consumer. The message producer updates a writer counter indicative of an amount of data in the messages stored into the shared memory. Subsequently, the message is received at the message consumer, and the message consumer determining, based on a comparison of the writer counter, whether the received message is accurate.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

An example configuration of a unidirectional, or one-way network communication mechanism is discussed below. The disclosed approach employs a shared memory region for passing a message between a message producer and a message consumer. The message producer, or sender. has read and write access to the shared memory region, and the message consumer, or receiver, has only read access to the shared memory region (shared memory). The shared memory may be a physical, network device with physical memory disposed in an electronic network, LAN (Local Area Network) or direct connection between respective computers defining the producer and consumer. The shared memory may also be fulfilled by a suitable memory region disposed in either the producer or consumer or in any intermediate device, where the memory has the read/write access properties discussed above.

Unidirectional communication is an inherently best-effort (aka unreliable) communication mechanism. Under unidirectional communication the consumer cannot acknowledge receipt of the messages. The following approach provides an so-called "unreliable" communication channel, which simply means there is not a bidirectional protocol of acknowledgement available and message delivery cannot be guaranteed. The consumer may experience resource starvation if the producer is overwhelming the shared memory with messages. Atomic delivery of a datagram message is guaranteed, meaning that assuming the local memory buffer of the consumer is large enough then the consumer receives either the entire message or none of the message. Another example of an unreliable, datagram-oriented message passing protocol is the User Datagram Protocol (UDP) network transfer protocol.

Many conventional networking approaches (protocols) are built on top of datagram guarantees. The network card and the operating system software provide these datagram guarantees. In contrast, the shared memory approach herein provides a consistency model that describes the order of memory reads and writes. Datagram guarantees are generally not provided by shared memory, but rather need be constructed according to the approach herein when using shared memory as a communication/network/intercomputer mechanism. Configurations herein substantially overcome this restriction of unidirectional shared memory by constructing datagram guarantees while accommodating the restriction of unidirectional shared memory. As noted above, certain contexts benefit from the shared memory message passing for enforcing network security measures.

Figure 1:
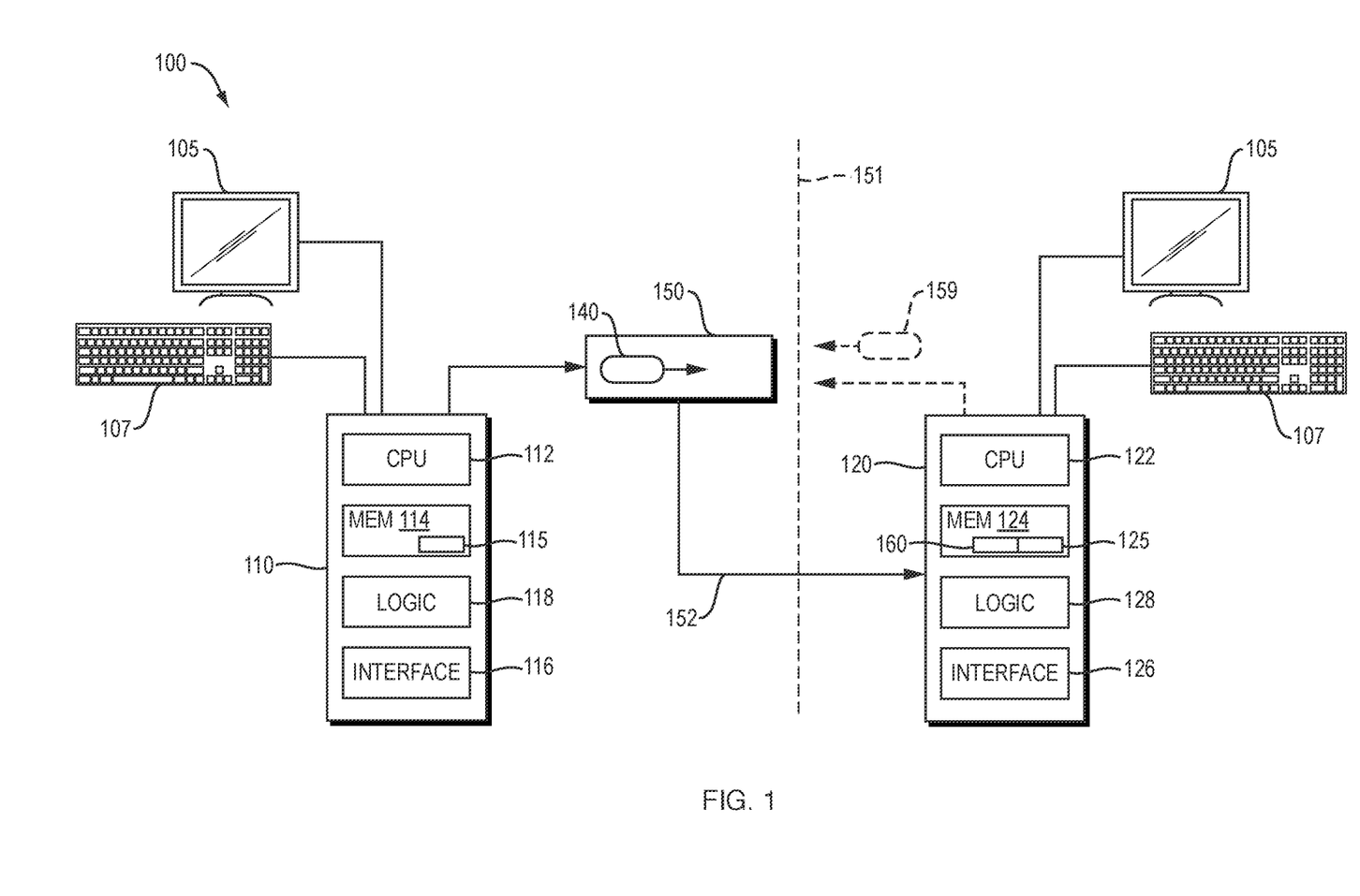
FIG. 1 is a context diagram of a computing environment suitable for use with configurations herein.

FIG. 1 is a context diagram of a computing environment suitable for use with configurations herein. In the environment 100 of FIG. 1, a message producer 110 is a computing device having a CPU (Central Processing Unit, or simply processor) 112, a memory 114, typically in close proximity to the CPU such as on the same motherboard, and an interface 116 for communicating with a message consumer 120. The message consumer 120 is similarly equipped with a CPU 122, memory 124 and interface 126. Atomic transaction logic for producer (transmission) 118 and consumer (receipt) 128 directs message transactions as disclosed herein. Each computing device 110, 120 also has relevant user interfaces such as a monitor 105 and a keyboard 107 and mouse; alternatively such interfaces may be indirect or remote in the case of the computing devices 110, 120 simply being network conversant devices.

The message producer 110 connects to a shared memory 150 via the interface 116. The message consumer 120 also connects to the shared memory 150 via its interface 126. A general flow of operation as discussed herein includes generating a message 140 in the memory 114 on the message producer 110, in which the message 140 is for transmission to the message consumer 120. The message 140 for transmission may be generated in any suitable manner on the message producer 110, based on local applications, data, and other network connections. The generated message 140 is fetched from the memory 114, at location 115 (discussed further below) on the message producer 110 into the shared memory 150, and the message consumer 120 transfers the message from the shared memory 150 into the memory 124 for further processing or storage. The shared memory 150 is accessible to be written by the message producer, and may be read by the message consumer, shown by arrow 152 as the message 140 is read into the local consumer memory 124, at location 125. The properties of the shared memory 150, however, impose a unidirectional write restriction, as attempts to write a message 159 or access memory on the producer side are prohibited.

Figure 2:
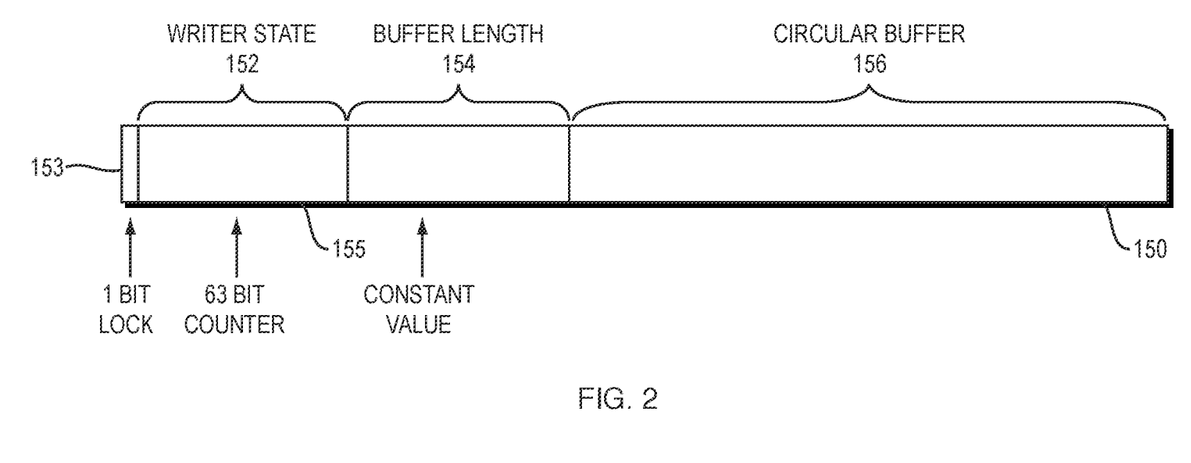
FIG. 2 is a block diagram of a shared memory region as in FIG. 1.

FIG. 2 is a block diagram of a shared memory region as in FIG. 1. Referring to FIGS. 1 and 2, the shared memory 150 is a memory region accessible for read access by both the message producer 110 and the message consumer 120, and accessible for write access by only the message producer 110. The shared memory 150 defines fields or regions, used in the message transaction further below. These fields include a writer state 152, which occupies a 64 bit word, further subdivided into a stop bit 153 (first bit) and a writer counter 155 (next 63 bits). A buffer 156 stores the message 140, which includes storing a length and payload of one or more messages for transmission to the message consumer 120, and a buffer length 154 filed indicative of a fixed size of the buffer 156. Although the buffer size 156 is generally fixed, it is stored in the shared memory 150 because it is important that the message consumer 120 have access, as will be discussed further below. Similarly, the writer state 152 is employed by the message consumer 120 in receiving the messages 140-1 . . . 140-N (140 generally) in sequence and in an atomic manner.

Figure 3:
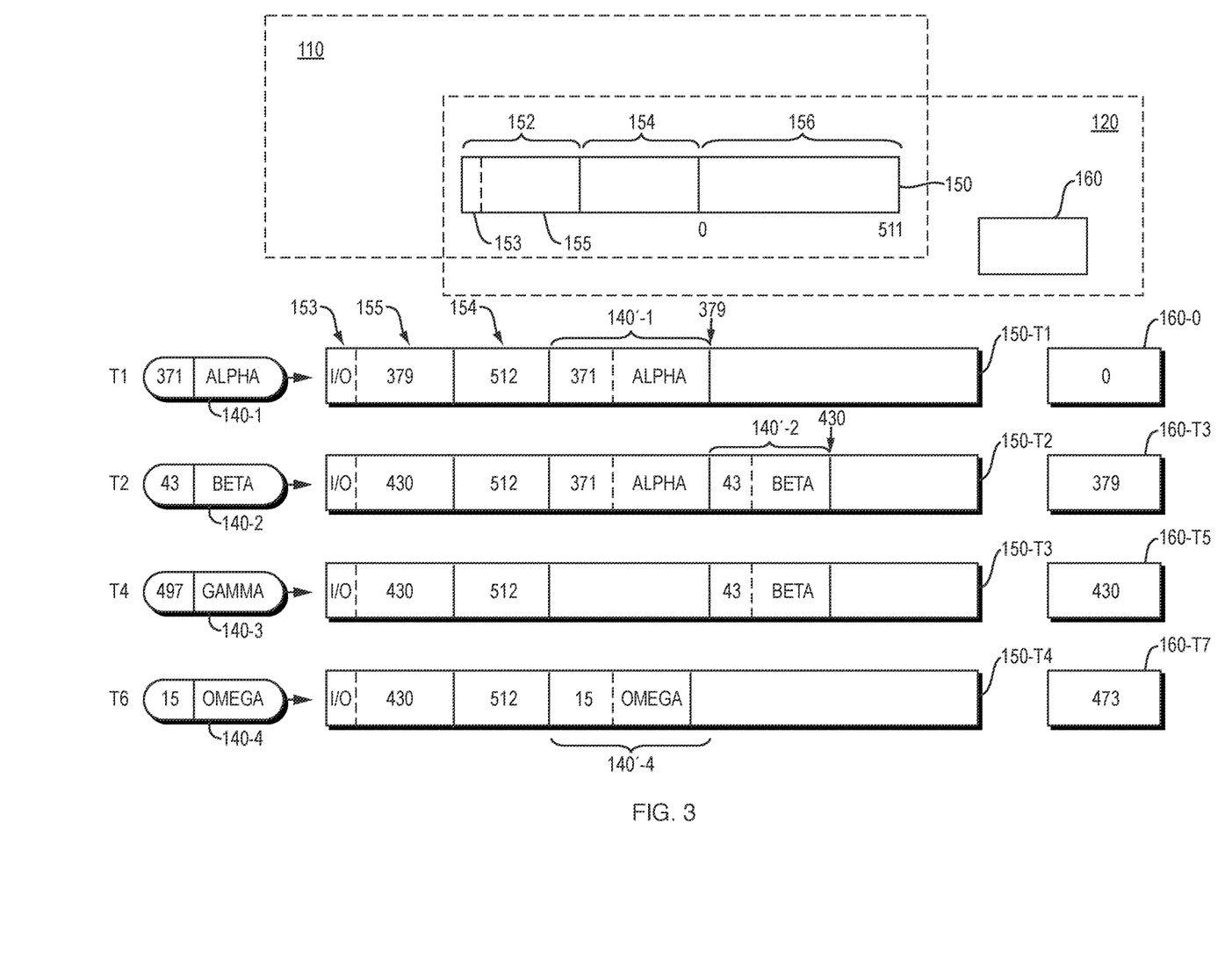
FIG. 3 is an example of message passing using the shared memory region of FIG. 2.

FIG. 3 is an example of message passing using the shared memory region of FIG. 2. Referring to FIGS. 1-3, the shared memory 150 is accessible to both the message producer 110 and the message consumer 120 for read access. The message producer 110 sends a sequence of messages 140-1 . . . 140-4. A series of timing snapshots T1 . . . T7 shows values at progressing times. The information processing environment 100 has computing devices (producer 110, consumer 120) for storing and processing data, and depicts a method of transferring data in accordance with a security standard for limiting memory access between the respective memories 114, 124 of the computing devices. For each of the message 140-1 . . . 140-4, the message producer 110 stores a message for transmission 140-N into the shared memory 150 accessible by the message consumer 120, such that the shared memory is concurrently unavailable for write access by the message consumer. Write access restrictions may be enforced by any suitable architecture that satisfies the relevant security requirements, such as hardware restrictions, such as a separate, intermediate shared memory device, or by other software or hardware designations that limit the ability of the consumer processor 122 from issuing a write operation or opcode into the addresses defining the shared memory 150.

Each of the message producer 110 and message consumer 120 have a respective counter to indicate the number of bytes transferred. These counters match if the message passing has been atomic—i.e. each message sent, while not explicitly acknowledged, was received in entirety or not at all. The counters include a writer counter 155, which is stored in the shared memory 150 for access by both sides. A reader counter 160 resides on the memory 124 local to the message consumer 120. Atomicity is achieved by updating the writer counter 155 to indicate of an amount of data in the messages stored into the shared memory upon transferring the message 140 into the shared memory. Subsequently, the message consumer 120 receives (reads) the message and transfers it into local memory to free up space in the buffer 156 for additional messages. Upon receiving the message at the message consumer 120, the consumer logic 128 determines, based on a comparison of the writer counter 152, whether the message 140 received by the message consumer 120 is accurate. If a problem such as an incomplete message or buffer 156 overflow occurs, the message is ignored, and the counters 155, 160 reset to receive successive messages.

The shared memory 150 of FIG. 2 has a buffer 156 of 512 bytes for the example of FIG. 3, shown in the buffer length 154. In operation, the buffer size is likely substantially larger, to accommodate the possibility of multiple messages being sent by the producer before being received by the consumer. Since there is no acknowledgement with unidirectional communication, and since the producer 110 and consumer 120 are asynchronous (driven by separate processors), there is no assurances of timing alignment. In general, the consumer 120 polls and waits for a message 140 to be placed in the shared memory 150 by the producer, but the producer 110 may send many messages before receipt if the consumer is burdened. The approach herein stores the messages sequentially as datagrams, or an 8 byte size field followed by the message body, also called a payload, in consecutive (contiguous) locations in the buffer 156 as the consumer 120 reads them off, similar to a queue of messages. The messages do not "wrap," the buffer 156; if a message 140 would exceed the limit of the buffer length 154, the entire message is written commencing at the beginning of the buffer 156. Messages having a length that would either overrun the end of the buffer 156, or would overwrite previous messages not yet read from the buffer 154, are accommodated by a flag value (or "tombstone") value, discussed further below. While this may result in overwriting and failure of some messages, atomicity and accuracy is preserved in the messages that are received.

Continuing to refer to FIG. 3 in particular, at time T1 the message producer 110 generates a message 140-1 "alpha" having a size of 371 bytes. The message producer 110 updates the writer counter 155 upon storing the message into the shared memory 150. Prior to storing the message in the shared memory 150, the message producer 110 stores a stop bit ("1") indicative a current write operation in progress. This alerts the message consumer 120 to refrain from attempting to read during a write still in progress. Following completion of storing the message in the shared memory, the message producer 110 resets the stop bit 153 for indicating successful completion ("0"). If, during the write operation, the message consumer 120 examines the stop bit, it returns a "0" and therefore refrains from fetching the message by the message consumer, since the stop bit is indicative of the message producer continuing to store the message into the shared memory. Any such read attempt would likely result in a corrupt, partial message.

The shared memory 150 can store multiple messages for transmission. Each message for transmission is generally queued by the message producer by storing a length and payload of the respective message into contiguous memory locations in the shared buffer. Each successive message 140-N is stored contiguously with a previous stored message 140 (N-1), up to the limits of the buffer 156. As applied in FIG. 3, at time T2 the "beta" message 140-2 is written, having a length of 43. Since the message consumer has not yet read message 140-1, the buffer 156 stores message 140-2 contiguously following 140-1. The writer counter 155 is updated to reflect the total byte count to 430, including the length of the 8 byte message size field.

At time T3, the stop bit 153 has been cleared and the message consumer begins a read (recall that the producer and consumer operate asynchronously without direct communication). The message consumer 120 accumulates, in a reader counter 160 at the message consumer, an aggregation of the amount of data received from the shared memory 150, meaning an ongoing count of all bytes. After the first message 140-1 read, this value is 379, based on a 371 byte message body and an 8 byte length, and based on an initialized value of 0 160-0. The message consumer 120 determines the accuracy of the received message based on a comparison of the reader counter 160-T3 and the writer counter 155 in shared memory 150-T1, which agree (371+ 8=379).

Recall that both the reader counter 160 and the writer counter 155 are maintained to indicate a total aggregate number of bytes transferred by the message producer to the message consumer via the shared memory 150, which is different than an index that indicates a current position in the shared memory. The message consumer 120 maintains the reader counter to indicate a total number of bytes received by the message consumer via the shared memory. Both counters 155, 160 therefore continually increment based on the sequence of all messages successfully transferred.

At time T4, producer 110 attempts to write message 140-3 "gamma," with a length of 497, however consumer 120 has not yet read the beta message 140-2. Accordingly, there is insufficient space in the buffer 156, and the message transaction is not completed. Reader counter 160-T3 and writer counter 155 in 150-T3 reflect that the gamma message was not transferred.

At T5, the consumer 120 reads the beta message 140'-2 out of the buffer 156, and updates the reader counter 160-T5 accordingly. All pending messages 140 have now been drained from the buffer 156 and the reader and writer counts 160-T5, 155 in 150-T3 match.

At time T6, message "omega" 140-4 is generated and written. The buffer 156 is now available to receive messages at the start (index 0) of the buffer. Since the counter has now "wrapped," the producer 110 computes an index into a current message 140-4 for transfer based on a modulo of the writer counter 155 by the length 154 of the message buffer in the shared memory. Similarly, the message consumer 120 computes an index into the current message 140-4 based on a modulo of the reader counter 160 by the length 154 of the message buffer 156 in the shared memory 150, such that the index based on the writer counter is aligned with the index based on the reader counter for determining length and message payload of the current message. At time T7, the consumer 120 reads the message 140-4 and updates the reader counter 160-T7. Both counters 155, 160 continue to reflect to total count, or sequence of bytes such that a MOD function can be used to derive the index.

Figure 4:
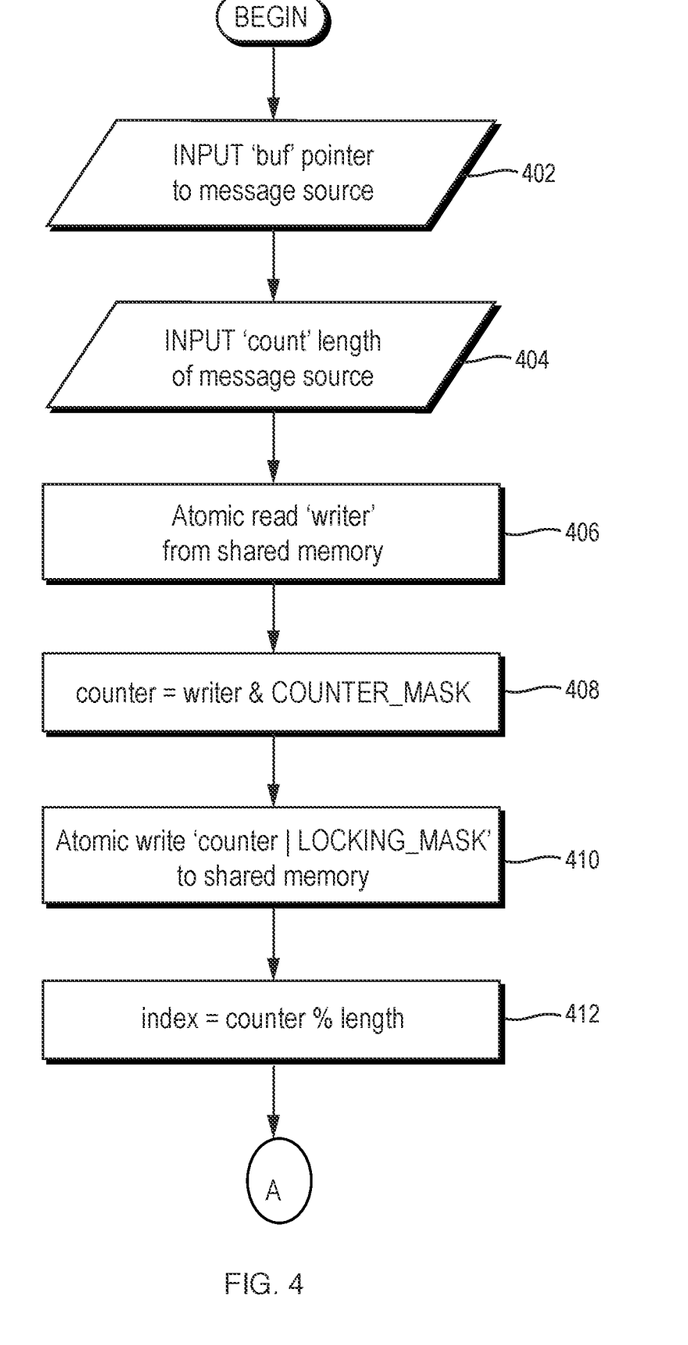
FIG. 4 is a flowchart of a message producer sending a message via the shared memory region of FIGS. 1-3.

FIG. 4 is a flowchart of a message producer sending a message via the shared memory region of FIGS. 1-3, and FIG. 5 is a flowchart of a message consumer receiving a message via the shared memory region of FIGS. 1-4. As shown in FIG. 1, in the unidirectional message passing approach, the message producer 110 employs producer logic 118, and the message consumer employs consumer logic 128, each running asynchronously from the other. The only communication is by the producer logic 118 invoking a write to the shared memory 150, from which the consumer logic 128 may read.

Figure 5:
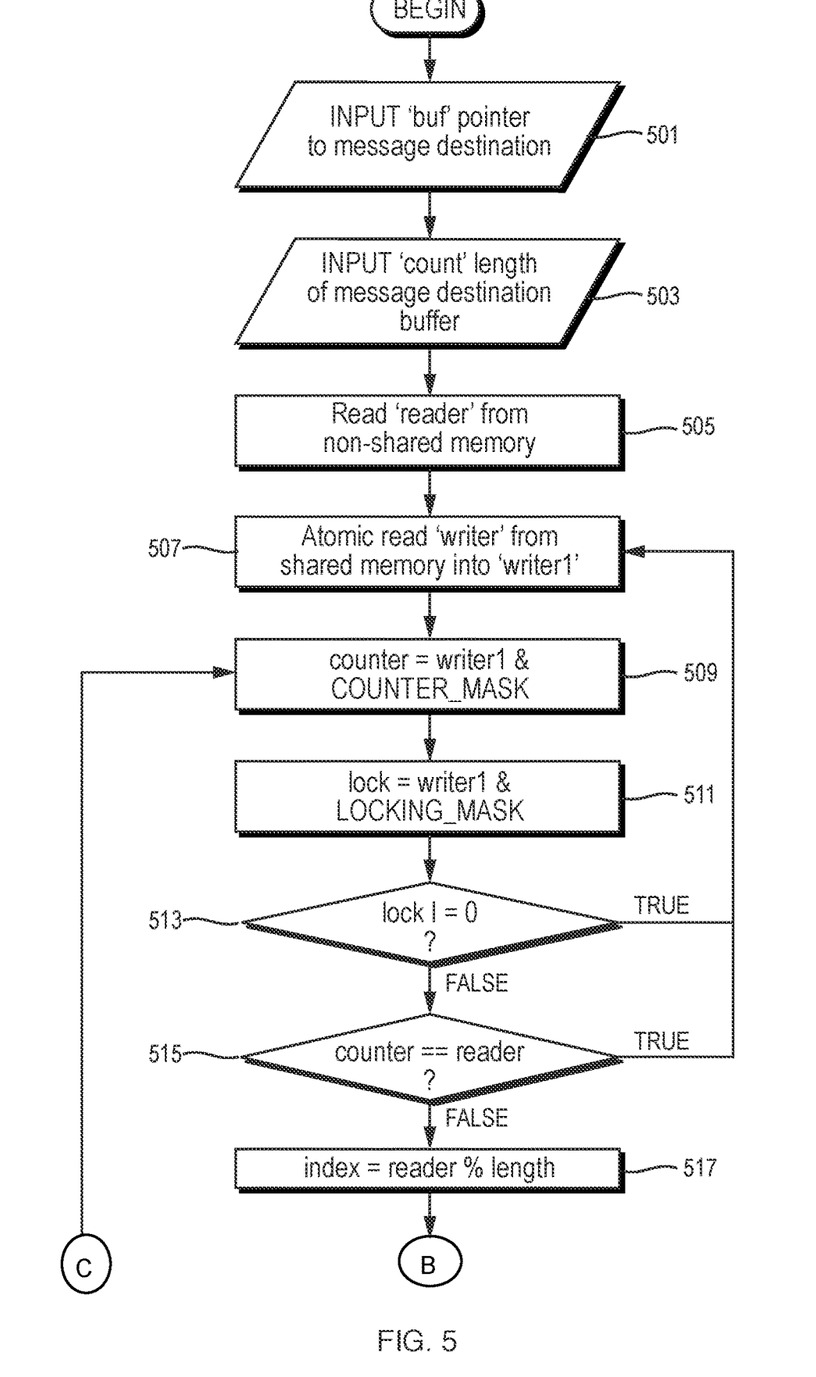
FIG. 5 is a flowchart of a message consumer receiving a message via the shared memory region of FIGS. 1-4.

In the flowcharts of FIGS. 4 and 5, several terms are employed and defined as follows:

Count is the size of the current message.

Counter is the writer counter 155 representing the ongoing total of message bytes transferred via the shared memory buffer field, readable by both writer (producer) and reader (consumer).

Index is the current position in the shared memory buffer field.

Length is the size of the shared memory buffer field, or buffer length 154.

Rbytes is the number of bytes to be read in the current message (read side of count).

Reader is the reader counter 160 on the message consumer side (local to message consumer, not in shared memory), and is the counterpart to the Counter used by the producer, stored in shared memory so that the consumer may access as well.

The disclosed approach employs 8 bytes in the size field of each message (datagram) written to the shared memory buffer field, however any suitable size of length field may be employed. Byte counts of each message generally add 8 when computing a number of bytes in messages 140.

It stands to reason that the counter mod the length gives the current index. The writer state field 152 includes both the stop bit 153 and counter 155, and is often read via a mask; accordingly, the following constants are employed:

LOCKING_MASK=0x8000000000000000L
COUNTER_MASK=0x7FFFFFFFFFFFFFFFL
TOMBSTONE=0xFFFFFFFFFFFFFFFFL

The data structure of the shared memory 150 is responsive to these masks is as follows:

struct {
  uint64_t writer;
  uint64_t length; //constant
  uint8_t data[0];
}

The TOMBSTONE value refers to the flag value unlikely to appear as any real data sequence. Based on the bit positions in the writer state, the locking mask is for computing a value of the stop bit in the writer state (low bit), and the counter mask is for computing a value of the writer counter in the writer state (high 63 bits), In the flowcharts of FIGS. 4 and 5, reading the message 140 includes reading the writer state 152 from the shared memory 150 by both the message producer 110 and the message consumer 120, and reading the locking mask and counter mask as constants available from respective memory of both the message producer and the message consumer. Oher suitable bit structures and compile time constants will be apparent to those of skill for managing similar data structures as called for by the producer logic 118 and consumer logic 128.

A message 140 is first generated in the memory 114 of the producer 110, at a location 'buf' 115 with a length 'count,' as depicted at steps 402 and 404. The producer 110 reads the writer state 152, at step 406, and computes the current value of the writer counter 155 (Counter), as disclosed at step 408.

The producer 110 begins a send operation with an atomic memory write to set the lock bit using the LOCKING MASK, as depicted at step 410. A current index for the location of the write operation is computed via a MOD operation based on the length 154, at step 412. The modulo (%) is used at the beginning of a write operation or a read operation (discussed in FIG. 5 below) to check and coordinate a number of "laps" (message read/write) cycles through the shared memory 150. Next the producer 110 will attempt to write to the shared memory (buffer) 150.

A check is performed, at step 414, to determine if there is enough space in the shared buffer 156. In the case of a non-overflow, or "normal" write, the message is written per step 424 below. The write operation has the responsibility to ensures that it will not perform a write that is split across the buffer. These are the checks at step 414 and 416. Conversely, discussed below, the read operation will test for an implicit tombstone (step 519) and test whether or not the reader is one or more entire laps behind the writer (step 525). The producer 110 is configured for storing a plurality of messages for transmission in the shared memory 150. The check at step 414 therefore identifies when a successive message 140-(N+1) of the plurality of messages would exceed a capacity of the shared memory 150, as defined by the length 154 of the buffer 156. If there is enough space in the shared buffer 156 then the length of the message 140, or datagram, is written followed by the contents of the datagram, as depicted at steps 424 and 426, based on the input values from steps 402 and 404.

Otherwise, a further check is performed at step 416 to attempt to store a flag value in the shared memory for indicating a potential overflow condition. If there is not sufficient space in the shared buffer then the tombstone value is written as the length of the datagram, as shown at step 418, and the writer counter is advanced to the start of the next iteration of the shared buffer, as depicted at step 420. The flag value is defined by the tombstone value and consists of all binary 1's as the length of the datagram. The check at step 416 merely covers the extreme boundary case where the buffer is too full to even accept the 8-byte tombstone value, and relies on an "implicit" tombstone. Recall that unlike acknowledgment rich protocols (most notably TCP/IP), an inability to write the message will trigger a reset of the indices and restart at the beginning of the buffer, to avoid a partial message exchange and guarantee atomicity of messages that are received. In other words, atomicity of delivered messages is prioritized above dropped/lost messages, so an undeliverable condition results in resetting both indices to the beginning of the shared memory 150, discussed further with respect to the read operation in FIG. 5.

If the check at step 416 indicates that there is not enough space to write the tombstone then the writer counter is also advanced to the start of the next iteration. This condition is an implicit tombstone value. The producer 110 will write successive messages in contiguous locations at a beginning of the shared memory buffer 156, as shown by resetting the index at step 422. To complete the write, the producer performs a second atomic memory write to update the writer state 152 at step and clear the lock bit. The writer state 152 is incremented by the number of bytes necessary to represent the length of a datagram and the number of bytes in the datagram, at step 428 and updates the counter 155, as depicted at step 430.

The consumer 120, as the receiver of the messages passed via the shared memory 150, generally polls the shared memory at periodic intervals for newly arriving messages. A size and location 'buf' 125 in the memory 124 at the consumer is identified, at steps 501 and 503. The current reader counter 160 is read, as depicted at step 505. The consumer 120 begins a receive operation with an atomic memory read of the writer state 152, as shown at step 507. This is the reason the writer state is stored in shared memory, otherwise the reader could never access it. The writer (producer 110), in contrast, does not need access to the reader counter 160. The counter mask and locking mask are invoked to obtain current values of the stop bit 153 and writer counter 155, as shown at steps 509 and 511. A check is performed, at step 513, and If the lock bit is set then the consumer 120 retries the receive operation. If the lock bit is clear then the consumer compares the writer counter with the reader counter, as disclosed at step 515. If the reader counter 160 and the writer counter 155 are equal then no data is available to read and the consumer retries the receive operation. An index of a current read position is computed, as depicted at step 517, using a MOD of the reader counter and the length 154 of the buffer 156.

As depicted on the producer sequence in FIG. 4, the read operation will test for an implicit tombstone (step 519) and test whether or not the reader is one or more entire laps behind the writer (step 525). Since the writer guarantees that its writes do not split across the buffer 150, the reader need not test for this condition. The modulo operator is used only to determine at what position the reader or the writer is in the buffer. The counters are storing the total number of bytes read or bytes written and the consumer must check that the producer and the consumer are the same number of iterations wrapped around the shared buffer. If the reader is one or more iterations behind the writer then the reader drops the unread datagrams and resumes at index 0 in the shared buffer at the current iteration of the writer.

Accordingly, a check is performed, at step 519, to determine if the message consumer is attempting to read the shared memory beyond a position at which the message producer 110 has written one or more of the messages, meaning the index exceeds the size 154 of the buffer 156, and if so, redirects the message consumer to a beginning of the shared memory for reading the message from contiguous memory locations, as shown at step 527. This includes setting the flag value at step 523 to force the tombstone value check at step 529, thereby reading the flag value, and based on the flag value, commencing reading the message from the beginning of the shared memory buffer 156.

Otherwise, the size of the current message 140 is read, at step 521 (being less than or equal to the buffer size), and a check is performed, at step 525, to determine if the difference between the writer counter 155 and the reader counter 160 is greater than the length 154 of the shared buffer 156. This complements the explicit and implicit tombstone values/conditions of steps 414 and 416 to indicate that the writer is ahead of the reader by one or more laps of the shared buffer. If the writer has lapped the reader then the reader counter is incremented to position the reader at the beginning of the most recent lap of the writer ((writer counter/length) *length) using integer division, as depicted at step 527. If the length of the datagram is an explicit or implicit tombstone, then the reader counter is incremented to the beginning of the most recent lap of the writer.

Otherwise, reading of the incoming message continues as length of the next message has been read from the shared buffer at step 521. An overflow check is performed at step 531. After the length of the datagram is read then the contents of the datagram are read into the local memory 125, as depicted at step 533. Finally the consumer ends the receive operation with an atomic memory read of the write state, at step 535. Based on the check at step 537, if the write state has changed in the interim then the consumer retries the receive operation at step 539.

If the post-read writer status remains unchanged at step 537, then the atomic read has been successful, the reader counter 160 is updated with the new total based on the incoming message 140 and length field (8 bytes), as depicted at step 541, and stored for successive iterations, as shown at step 543.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as solid state drives (SSDs) and media, flash drives, floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions, including virtual machines and hypervisor controlled execution environments. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In an information processing environment having a plurality of computing devices for storing and processing data, a method of transferring data in accordance with a security standard for limiting memory access between the respective memories of the computing devices, comprising:
   storing a message for transmission to a message consumer into a shared memory accessible for reading by the message consumer, the shared memory unavailable for write access by the message consumer;
   updating a writer counter indicative of an amount of data in the messages stored into the shared memory, the shared memory being a memory region accessible for read access by both a message producer and the message consumer, and accessible for write access by only the message producer, the shared memory further including:
      a writer state, the writer state including a stop bit and the writer counter;
      a buffer for storing a length and payload of one or more messages for transmission to the message consumer; and
      a buffer length indicative of a fixed size of the buffer;
   receiving the message at the message consumer; and
   determining, based on a comparison of the writer counter, whether the message received by the message consumer is accurate.

2. The method of claim 1 further comprising:
   generating the message in a memory on a message producer; the message for transmission to the message consumer;
   fetching the message from the memory on the message producer into the shared memory; and
   transferring the message from the shared memory into the memory at the message consumer.

3. The method of claim 1 further comprising:
   updating the writer counter upon storing the message into the shared memory;
   accumulating, in a reader counter at the message consumer, an aggregation of the amount of data received from the shared memory; and
   determining the accuracy of the received message based on a comparison of the reader counter and the writer counter.

4. The method of claim 1 further comprising:
maintaining the writer counter to indicate a total number of bytes transferred by the message producer to the message consumer via the shared memory;
maintaining the reader counter to indicate a total number of bytes received by the message consumer via the shared memory;
computing an index into a current message for transfer based on a modulo of the writer counter by a length of a message buffer in the shared memory; and
computing an index into the current message by the message consumer based on a modulo of the reader counter by the length of the message buffer in the shared memory, the index based on the writer counter aligned with the index based on the reader counter for determining length and message payload of the current message.

5. The method of claim 1 further comprising a locking mask and a counter mask,
the locking mask for computing a value of the stop bit in the writer state; and
the counter mask for computing a value of the writer counter in the writer state, wherein:
reading the message includes reading the writer state from the shared memory by both the message producer and the message consumer; and
reading the locking mask and counter mask as constants available from respective memory of both the message producer and the message consumer.

6. The method of claim 1 further comprising storing a plurality of messages for transmission in the shared memory, each message of the plurality of messages for transmission stored by the message producer, including:
storing, in contiguous memory locations in the shared buffer, a length and payload of the respective message; and
storing each successive message contiguously with a previous stored message.

7. The method of claim 1 further comprising:
storing a plurality of messages for transmission in the shared memory, each message of the plurality of messages for transmission stored by the message producer;
identifying when a successive message of the plurality of messages would exceed a capacity of the shared memory;
storing a flag value in the shared memory for indicating a potential overflow condition; and
writing the successive message in contiguous locations at a beginning of the shared memory.

8. The method of claim 7 further comprising:
determining if the message consumer is attempting to read the shared memory beyond a position at which the message producer has written one or more of the messages; and if so,
redirecting the message consumer to a beginning of the shared memory for reading the message from contiguous memory locations.

9. The method of claim 8 wherein determining an attempt to read beyond a position written by the message producer further comprises reading the flag value, and based on the flag value, commencing reading the message from the beginning of the shared memory.

10. In an information processing environment having a plurality of computing devices for storing and processing data, a method of transferring data in accordance with a security standard for limiting memory access between the respective memories of the computing devices, comprising:
generating a message in a memory on a message producer; the message for transmission to a message consumer;
fetching the message from the memory on the message producer for transmission to the message consumer, and storing the message into a shared memory accessible for reading by the message consumer, the shared memory unavailable for write access by the message consumer;
prior to storing the message in the shared memory, storing a stop bit indicative of a current write operation in progress;
updating a writer counter indicative of an amount of data in the messages stored into the shared memory;
following completion of storing the message in the shared memory, resetting the stop bit for indicating successful completion;
examining, by the message consumer, the stop bit;
refraining from fetching the message by the message consumer if the stop bit is indicative of the message producer continuing to store the message into the shared memory;
transferring the message from the shared memory into the memory at the message consumer; and
determining, based on a comparison of the writer counter, whether the message received by the message consumer is accurate.

11. A data transfer device, comprising:
a shared memory connected to a message consumer and a message producer;
an interface from message consumer for storing a message for transmission to a into the shared memory accessible for reading by the message consumer, the shared memory unavailable for write access by the message consumer;
a writer counter indicative of an amount of data in the messages stored into the shared memory, the shared memory being a memory region accessible for read access by both the message producer and the message consumer, and accessible for write access by only the message producer, the shared memory further including:
a writer state, the writer state including a stop bit and the writer counter;
a buffer for storing a length and payload of one or more messages for transmission to the message consumer; and
a buffer length indicative of a fixed size of the buffer;
consumer logic programmed to receive the message at the message consumer; and
determine, based on a comparison of the writer counter, whether the message received by the message consumer is accurate.

12. The device of claim 11 further comprising:
an interface to a memory on a message producer; the memory storing a generated message for transmission to the message consumer; and
producer logic programmed for fetching the message from the memory on the message producer into the shared memory,
the producer logic programmed to transfer the message from the shared memory into the memory at the message consumer.

13. The device of claim 11 wherein the producer logic is further programmed to:
update the writer counter upon storing the message into the shared memory; and the consumer logic further programmed to:
accumulate, in a reader counter at the message consumer, an aggregation of the amount of data received from the shared memory; and
determine the accuracy of the received message based on a comparison of the reader counter and the writer counter.

14. The device of claim 11, wherein the producer logic is further programmed to:
maintain the writer counter to indicate a total number of bytes transferred by the message producer to the message consumer via the shared memory;
compute an index into a current message for transfer based on a modulo of the writer counter by a length of a message buffer in the shared memory; and
the consumer logic is further programmed to:
maintain the reader counter to indicate a total number of bytes received by the message consumer via the shared memory; and
compute an index into the current message by the message consumer based on a modulo of the reader counter by the length of the message buffer in the shared memory, the index based on the writer counter aligned with the index based on the reader counter for determining length and message payload of the current message.

15. The device of claim 11 wherein the shared memory is configured to store a plurality of messages for transmission, each message of the plurality of messages for transmission written by the producer logic in the message producer, the producer logic further configured to:
store, in contiguous memory locations in the shared buffer, a length and payload of the respective message; and
store each successive message contiguously with a previous stored message.

16. The device of claim 11 wherein the producer logic is further configured to:
store a plurality of messages for transmission in the shared memory, each message of the plurality of messages for transmission stored by the message producer;
identify when a successive message of the plurality of messages would exceed a capacity of the shared memory;
store a flag value in the shared memory for indicating a potential overflow condition; and
write the successive message in contiguous locations at a beginning of the shared memory.

17. A data transfer device, comprising:
a shared memory connected to a message consumer and a message producer;
an interface from the message consumer for storing a message for transmission into the shared memory accessible for reading by the message consumer, the shared memory unavailable for write access by the message consumer;
a writer counter indicative of an amount of data in messages stored into the shared memory;
an interface to a memory on the message producer; the memory storing a generated message for transmission to the message consumer; and
producer logic programmed for fetching and storing the message from the memory on the message producer into the shared memory;
the producer logic programmed to transfer the message from the shared memory into the memory at the message consumer;
consumer logic programmed to:
receive the message at the message consumer, and
determine, based on a comparison of the writer counter, whether the message received by the message consumer is accurate;
wherein the producer logic is further programmed to:
prior to storing the message in the shared memory, store a stop bit indicative of a current write operation in progress;
following completion of storing the message in the shared memory, reset the stop bit for indicating successful completion; and
the consumer logic further programmed to:
examine, by the message consumer, the stop bit; and
refrain from fetching the message by the message consumer if the stop bit is indicative of the message producer continuing to store the message into the shared memory.

18. A computer program embodying program code on a non-transitory medium that, when executed by a processor, performs steps for implementing a method of transferring data between computers, the method comprising:
storing a message for transmission to a message consumer into a shared memory accessible for reading by the message consumer, the shared memory unavailable for write access by the message consumer;
updating a writer counter indicative of an amount of data in the messages stored into the shared memory, the shared memory being a memory region accessible for read access by both a message producer and the message consumer, and accessible for write access by only the message producer, the shared memory further including:
a writer state, the writer state including a stop bit and the writer counter;
a buffer for storing a length and payload of one or more messages for transmission to the message consumer; and
a buffer length indicative of a fixed size of the buffer;
receiving the message at the message consumer; and
determining, based on a comparison of the writer counter, whether the message received by the message consumer is accurate.

* * * * *